(12) United States Patent
Buca et al.

(10) Patent No.: US 10,685,335 B2
(45) Date of Patent: Jun. 16, 2020

(54) INTEGRATED ASSET INTEGRITY MANAGEMENT SYSTEM

(71) Applicant: Parker-Hannifin Corporation, Cleveland, OH (US)

(72) Inventors: Peter Vincent Buca, Sandusky, OH (US); William E. Sayavich, Twinsburg, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 374 days.

(21) Appl. No.: 15/557,824

(22) PCT Filed: Apr. 20, 2016

(86) PCT No.: PCT/US2016/028348
§ 371 (c)(1),
(2) Date: Sep. 13, 2017

(87) PCT Pub. No.: WO2016/186790
PCT Pub. Date: Nov. 24, 2016

(65) Prior Publication Data
US 2018/0293551 A1    Oct. 11, 2018

Related U.S. Application Data

(60) Provisional application No. 62/162,108, filed on May 15, 2015.

(51) Int. Cl.
*G06Q 10/00* (2012.01)
*G06Q 10/08* (2012.01)
(Continued)

(52) U.S. Cl.
CPC ......... *G06Q 10/20* (2013.01); *G06K 7/10297* (2013.01); *G06Q 10/06313* (2013.01);
(Continued)

(58) Field of Classification Search
CPC ............... G06Q 10/20; G06Q 10/0833; G06Q 10/06313; G06Q 10/087; G06Q 50/10; G06K 7/10297; G06K 2007/10504
See application file for complete search history.

(56) References Cited

U.S. PATENT DOCUMENTS 5,495,576 A     2/1996  Ritchey
5,563,988 A    10/1996  Maes et al.
(Continued)

FOREIGN PATENT DOCUMENTS

WO    WO 2010/109340 A2    9/2010
WO    WO 2017/152704 A1    9/2014

OTHER PUBLICATIONS

Adgar, A., Addison, D., Yau, C-Y. (2007). Applications of RFID technology in maintenance systems. In: Proceedings of the second World Congress on Engineering Asset Management (WCEAM), Jun. 2007 (Year: 2007).*
(Continued)

*Primary Examiner* — Nathan A Mitchell
(74) *Attorney, Agent, or Firm* — Renner, Otto, Boisselle & Sklar, LLP

(57) ABSTRACT

An integrated asset integrity management system includes a plurality of asset information identifiers associated with a corresponding plurality of assets, a mobile communication device comprising a reading device for reading the identifiers, and a server in electronic communication with the mobile communication device. The server includes a database structure having a tracking system database that includes tracking system data corresponding to the asset information identifiers, and a performance database that includes data relating to performance of the assets. The mobile communication device transmits read asset information to the server. An electronic processor identifies assets corresponding to the read asset information identifiers and
(Continued)

determines asset integrity issues for any of the assets. An output device outputs an indicator associated with the determined integrity issue. A framing algorithm uses a drill down technique for honing in on integrity issues at a location that may include a plurality of assets.

19 Claims, 3 Drawing Sheets

(51) Int. Cl.
  *G06Q 10/06* (2012.01)
  *G06K 7/10* (2006.01)
(52) U.S. Cl.
  CPC ....... *G06Q 10/087* (2013.01); *G06Q 10/0833* (2013.01); *G06K 2007/10504* (2013.01)

(56) References Cited

U.S. PATENT DOCUMENTS

| | | | |
|---|---|---|---|
| 5,894,311 A | 4/1999 | Jackson | |
| 7,466,232 B2* | 12/2008 | Neuwirth | G06Q 10/08 340/10.1 |
| 7,899,535 B2 | 3/2011 | Bohn et al. | |
| 8,368,518 B1* | 2/2013 | Castrovinci | G06Q 50/08 340/10.51 |
| 9,462,357 B2* | 10/2016 | Westick | H04Q 9/00 |
| 10,304,030 B1* | 5/2019 | Tzannakos | G06Q 10/087 |
| 2006/0253590 A1* | 11/2006 | Nagy | H04L 67/125 709/226 |
| 2007/0043538 A1* | 2/2007 | Johnson | G06Q 30/08 702/188 |
| 2007/0043811 A1 | 2/2007 | Kim et al. | |
| 2007/0239569 A1* | 10/2007 | Lucas | G06Q 10/08 705/28 |
| 2008/0021718 A1* | 1/2008 | Kaartinen | G06Q 10/087 705/325 |
| 2008/0062167 A1 | 3/2008 | Boggs et al. | |
| 2008/0177665 A1* | 7/2008 | Noordam | H04L 9/3236 705/50 |
| 2008/0201388 A1* | 8/2008 | Wood | G06Q 10/06 |
| 2009/0051502 A1* | 2/2009 | Craik | G06Q 10/06 340/10.51 |
| 2009/0240120 A1 | 9/2009 | Mensinger et al. | |
| 2012/0320204 A1* | 12/2012 | Dahlin | G08G 1/09623 348/148 |
| 2013/0190897 A1* | 7/2013 | Junk | G05B 19/418 700/12 |
| 2014/0095114 A1* | 4/2014 | Thomeer | G06Q 10/20 702/187 |
| 2014/0095554 A1* | 4/2014 | Thomeer | G06F 16/9535 707/821 |
| 2014/0151446 A1 | 6/2014 | Bovell | |

OTHER PUBLICATIONS

International Search Report and Written Opinion for International Application No. PCT/US2016/028348, dated Oct. 6, 2016.
Second Written Opinion for International Application No. PCT/US2016/028348, dated May 15, 2017.
International Preliminary Report on Patentability for International Application No. PCT/US2016/028348, dated Aug. 24, 2016.

\* cited by examiner

INTEGRATED ASSET INTEGRITY MANAGEMENT SYSTEM

RELATED APPLICATIONS

This application is a national phase of International Patent Application Serial No. PCT/US2016/028348, filed on Apr. 20, 2016, which claims the benefit of U.S. Provisional Application No. 62/162,108 filed May 15, 2015, which are incorporated herein by reference.

FIELD OF INVENTION

The present invention relates to asset tracking and management systems, and particularly systems for tracking and management of mechanical component parts (assets) for maintenance, repair, and replacement.

BACKGROUND OF THE INVENTION

Tracking systems are known in the art for tracking information pertaining to mechanical components, commonly referred to generally as assets, particularly for addressing asset integrity issues such as maintenance, repair, and replacement. For example, such tracking systems may be employed in industries that utilize hydraulic fluid systems for controlling machinery. Hydraulic fluids systems are used in a large variety of industries, including in systems to generate driving power in vehicle transmissions, construction and mining equipment, farm equipment, undersea oil and gas drilling operations, and numerous others.

Hydraulic fluid systems are assembled from various component parts, including for example a wide variety of hoses and fittings. Each component hose or fitting may vary depending upon its role in the system. For example, hoses and fittings for high pressure hydraulic lines may have different properties (e.g., length, thickness, elasticity, bendability, material composition, etc.) as compared to such components for low pressure hydraulic fluid lines. In addition, component properties may vary depending upon environmental conditions of usage. For example, an undersea drilling operation is exposed to substantially different temperature and pressure conditions as compared to conditions of operation of an on-highway vehicle transmission. Component parts, therefore, will having differing properties as warranted to withstand any particular conditions of operation. It will be appreciated that although hydraulic systems are used as an illustrative example, asset variations are significant in any mechanical, machine, or equipment-using industry.

It is imperative, therefore, that mechanical assets be readily identifiable for asset integrity issues, particularly for maintenance, repair, and replacement of component parts. In the event of a component failure, extensive equipment downtime can be result in significant financial losses. Downtime periods may be extended if a correct component part or asset cannot be identified efficiently. It will be appreciated from the above example of hydraulic hoses and fittings, that the variety of component parts is vast. Many component parts may have some visual or superficial similarities rendering it difficult by simple eyeing to determine the correct part. In addition, some component properties may not be readily identifiable without a precise measurement or inspection (e.g., a precise hose length, or a fitting diameter). Asset identification, therefore, can be complex, and inefficient time spent identifying the correct asset increases downtime. Downtime further may be exacerbated should an initial asset identification be incorrect, requiring multiple iterations of the asset identification process. Accordingly, financial losses from extended downtimes from inefficient or incorrect asset identification present a serious issue for a variety of industries.

To reduce downtime, tracking systems have been developed for improved asset identification for maintenance, repair, and replacement. In one known system, an adhesive tag is fixed to an asset, such as a component part, the tag including basic part identifying information. For example, the tag may include a unique manufacturer part identification (ID), a corresponding customer part ID, a pertinent date (e.g., an assembly, manufacturing, or installation date), and customized printed information such as a part description or some other simple instruction or related information.

The tag further may include a coded portion. The coded portion may be a passive tag code, like a barcode, or an energizable code like an RFID tag or comparable near-field communication (NFC) device. The coded portion may be read by a corresponding conventional reading device such as a scanner. The reading device in turn may be in electronic communication with a database over a local or non-local network, such as the Internet. The database may include additional information about the component part or asset. Examples of the database information may include duplicative information contained on the tag itself, as well as additional information such as, for example, customer information, bills of material, application data, maintenance history or maintenance cycle, certification information, components drawings, and the like. The database in general may be populated in any suitable manner with useful information about the asset.

Such a tracking system may be used as follows. In the event of a report of a part failure, a technician in the field can read the tag on the component with the scanner or other suitable reading device. Through the network connection, the information read from the tag with the reading device may be matched to the database information about the component. Depending upon the capabilities of the reading device, the technician may be able to order the part, order related parts if warranted, and even update the database. For example, the reading device may be incorporated into a smartphone, tablet computer, or like mobile communication device with input/output computer-like functionality, that would permit a technician to enter part replacement and other maintenance orders and otherwise update the database information in any suitable manner.

Because of the electronic communication among the tag, reading device, and database, the asset identification and any related maintenance orders are performed with high efficiency and accuracy. Accuracy includes not only generalized part information, but also can encompass any pre-processing requirements such as sizing (e.g., cutting a given hose type to the required length). With such accuracy and efficiency, downtime is reduced, both in reduced processing time and the avoidance of mistaken part identifications.

The tracking system of the nature described above has proven effective for asset identification and related maintenance. Such system, however, essentially is a reactive, rather than a proactive, system. In other words, a component failure or similar trigger event (e.g., a scheduled inspection of the particular component) must prompt the investigation of the particular tag. The tracking system in and of itself does not provide any advanced warning or probability determination that would permit a proactive maintenance procedure in advance of an actual failure. Downtime can be reduced if a technician were able to identify assets with imminent integrity issues prior to an actual failure. More generally, even absent an imminent failure issue, it would be beneficial for a technician in the field to know the use or performance state of assets relative to potential integrity issues for resource allocation and planning, maintenance scheduling, predictive failure assessments, and the like.

One option for acquiring more proactive information is simply for a technician to periodically inspect assets at a given location or constituting components within a given system or piece of equipment (e.g., a vehicle or other machine). In such an inspection, a technician systematically can scan a related group of tags, thereby acquiring current status information from the database and updating the database as needed. Periodic inspections by scanning individual tags, however, are time consuming and non-targeted.

Some assets may have predetermined specifications pertaining to useful life. Useful life, for example, may be measured in chronological time or cycle life, upon which maintenance or replacement is to be performed. Such measures, however, are imprecise, as actual useful life can vary depending upon local operating conditions. Actual environmental or operating conditions that vary from an average or norm, such as weather, temperature, moisture, pressure, and others, can extend or reduce useful life from a predictive specification. In addition, even with a stricter adherence to useful life specifications, the tracking system by itself lacks a linkage to a technician for automatic notification. There still must be some trigger event, such as scanning a tag or a manual notice by a person monitoring the tracking system, to inform the technician of a needed maintenance or other integrity issue. Conventional tracking systems, therefore, lack integration with real-time and actual performance information, which precludes a more proactive asset integrity management system.

SUMMARY OF THE INVENTION

The present invention provides an integrated asset integrity management system (IAIMS) that integrates tracking system data with real-time and/or actual performance information. The IAIMS is a computer based system that integrates tracking system data created at the time of manufacture or installation of a product, system, or assembly (assets), and updates to such tracking system data, with real-time and actual performance data available at the site of the assets' installation. The real-time and actual performance data may be generated by sensors, logs of environmental conditions, or related data from any source that is indicative of actual performance. The IAIMS identifies current status of assets and communicates status to other computer systems, including mobile user devices used by technicians in the field, for the purpose of identifying integrity issues pertaining to maintaining system operations, efficiencies, or other functions. The data may be displayed as an overlay to live or recorded video feed of the installation or via user interface devices that provide the technician visuals of the installation. The data may be available either through live sensor data, data provided by access to the "cloud" or Internet or other network, or data stored locally on either the mobile devices or support equipment to the displays.

As aspect of the invention, therefore, is an integrated asset integrity management system (IAIMS). In exemplary embodiments, the IAIMS includes a plurality of asset information identifiers (e.g., affixed tags or other visual recognition indicators) associated with a corresponding plurality of assets, a mobile communication device comprising a reading device for reading the plurality of asset information identifiers, and a server in electronic communication with the mobile communication device. The server includes a database structure having a tracking system database that includes tracking system data corresponding to the asset information identifiers, and a performance database that includes data relating to actual performance of the assets. The mobile communication device is configured to transmit asset information read from asset information identifiers to the server. An electronic processor is configured to identify assets corresponding to the read asset information identifiers and to determine an asset integrity issue for any of the assets corresponding to the read asset information identifiers based on data in the database structure. An output device is configured to output an indicator associated with the determined integrity issue.

In exemplary embodiments, the IAIMS may include at least one sensor for sensing performance parameters related to the assets corresponding to the read asset information identifiers, wherein the performance data includes sensor data gathered by the at least one sensor. The sensors may include an equipment sensor that senses one or more operating parameters of a corresponding asset. The one or more operating parameters may include at least one of pressure, temperature, moisture level, cycle time, on-off time, physical wear, performance metrics or any other suitable operating parameter. The sensors further may include a location sensor that senses environmental conditions at the location of the assets corresponding to the read asset information identifiers. The sensor data may be transmitted to the server and stored in the performance database. The performance data further may include obsolescence data.

Another aspect of the invention is a method of managing asset integrity issues. In exemplary embodiments, the method may include the steps of identifying at least one asset; accessing tracking system data for the at least one identified asset; receiving performance data for the at least one identified asset; determining if any integrity issues are present for the at least one identified asset based on the accessed and received data; and outputting on a mobile communication device information about a determined integrity issue. The method further may include generating a recommendation for addressing the determined asset integrity issue, and outputting the recommendation on the mobile communication device.

In exemplary embodiments, the method is performed using a framing algorithm that employs a drill down technique for honing in on integrity issues at a location that may include a plurality of assets. In particular, the method may include the steps of identifying a plurality of assets in a first frame; determining if any integrity issues are present for the identified plurality of assets in the first frame; outputting on the mobile communication device a first indicator about determined integrity issues for the plurality of assets in the first frame, wherein the first indicator is a generalized indicator about integrity issues of assets in the first frame; identifying at least one asset in a second frame, the second frame being a narrower frame that is a subset of the first frame; determining if any integrity issues are present for the at least one identified asset in the second frame; and outputting on the mobile communication device a second indicator about determined integrity issues for the least one asset in the second frame. The method may employ a drill down technique by which the above steps are repeated as to successively narrowing frames until an integrity issue is identified for a particular asset.

Another aspect of the invention is a non-transitory computer readable medium storing executable program code, which when executed by an electronic device is configured to perform steps of the methods of managing asset integrity issues.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
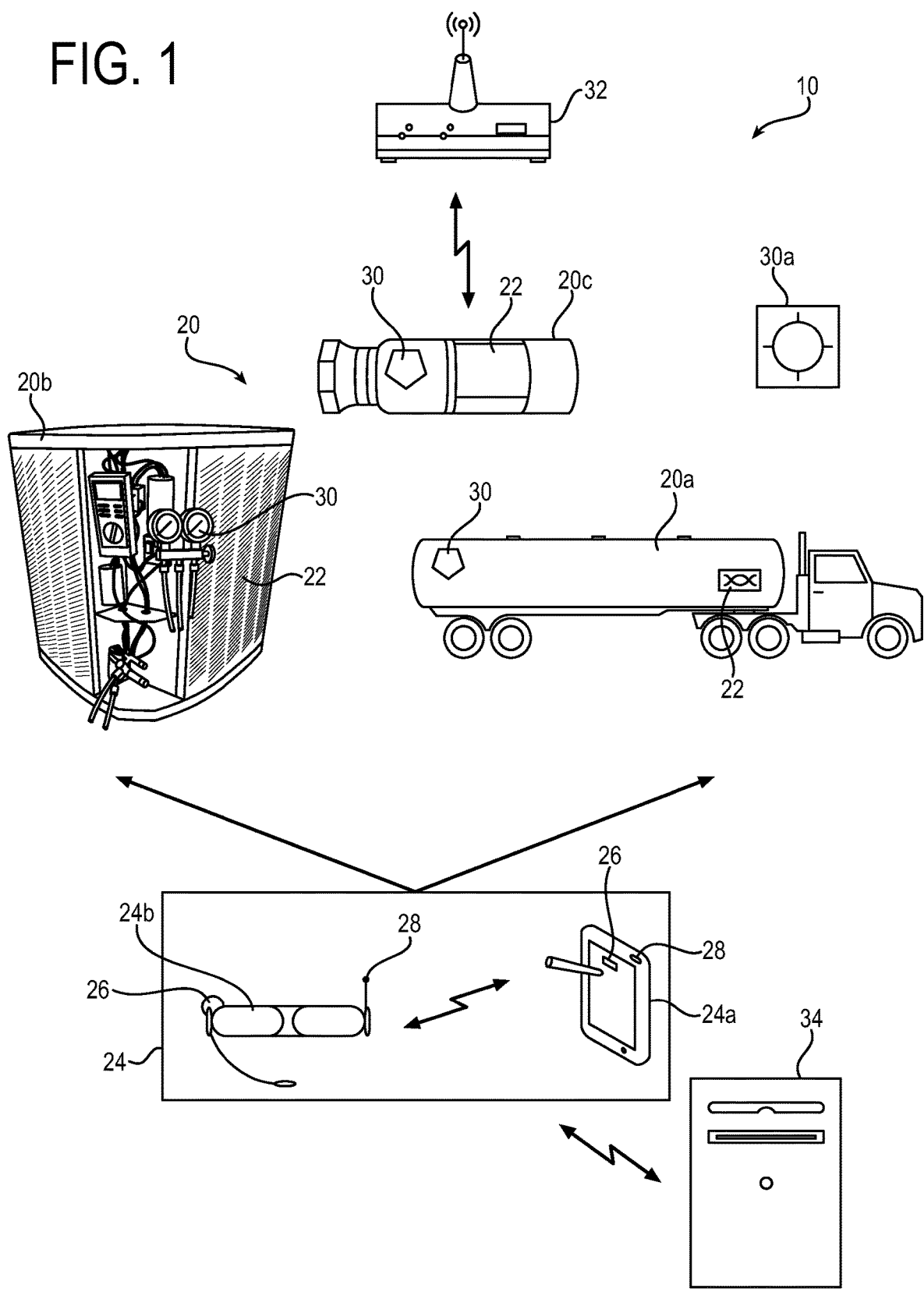
FIG. 1 is a diagram depicting operative portions of an exemplary integrated asset integrity management system (IAIMS) in accordance with embodiments of the present invention.

Embodiments of the present invention will now be described with reference to the drawing, wherein like reference numerals are used to refer to like elements throughout. It will be understood that the figures are not necessarily to scale.

FIG. 1 is a diagram depicting operative portions of an exemplary integrated asset integrity management system (IAIMS) 10 in accordance with embodiments of the present invention. FIG. 1 illustrates a general overview of the IAIMS 10. IAIMS 10 integrates tracking system data with real-time and actual performance information pertaining to a plurality of assets 20. In the example of FIG. 1, the assets 20 may include a tanker truck 20a, an air conditioning unit 20b, and a hose assembly 20c. It will be appreciated that assets 20a-c are illustrative examples, and such assets may be any suitable machine, equipment, vehicle, and the like, and components thereof. Each asset may tend to be a singular component, such as the hose assembly 20c, or an equipment containing multiple components such as the tanker truck 20a and air conditioning unit 20b. Each asset 20 may have affixed to it an asset information identifier 22 associated with the corresponding asset. For example, the asset information identifier may be a tracking system coded tag 22 as referenced above.

The IAIMS 10 further may include one or more mobile communication devices 24. Each mobile communication device may be any portable electronic device with computing functionality as are known in the art. Examples of such devices include mobile telephones, smartphones, tablet or laptop computers, and like devices. In the example of FIG. 1, two exemplary mobile communication devices are shown, the first being a tablet computer 24a and the second being a headset 24b to be worn by a technician. Each mobile communication device 24 has a reading device 26 for reading the asset information identifiers, e.g., the tracking system tags, and an electronic receiver 28 for receiving or transmitting real time and/or actual performance data pertaining to the assets 20.

Figure 2:
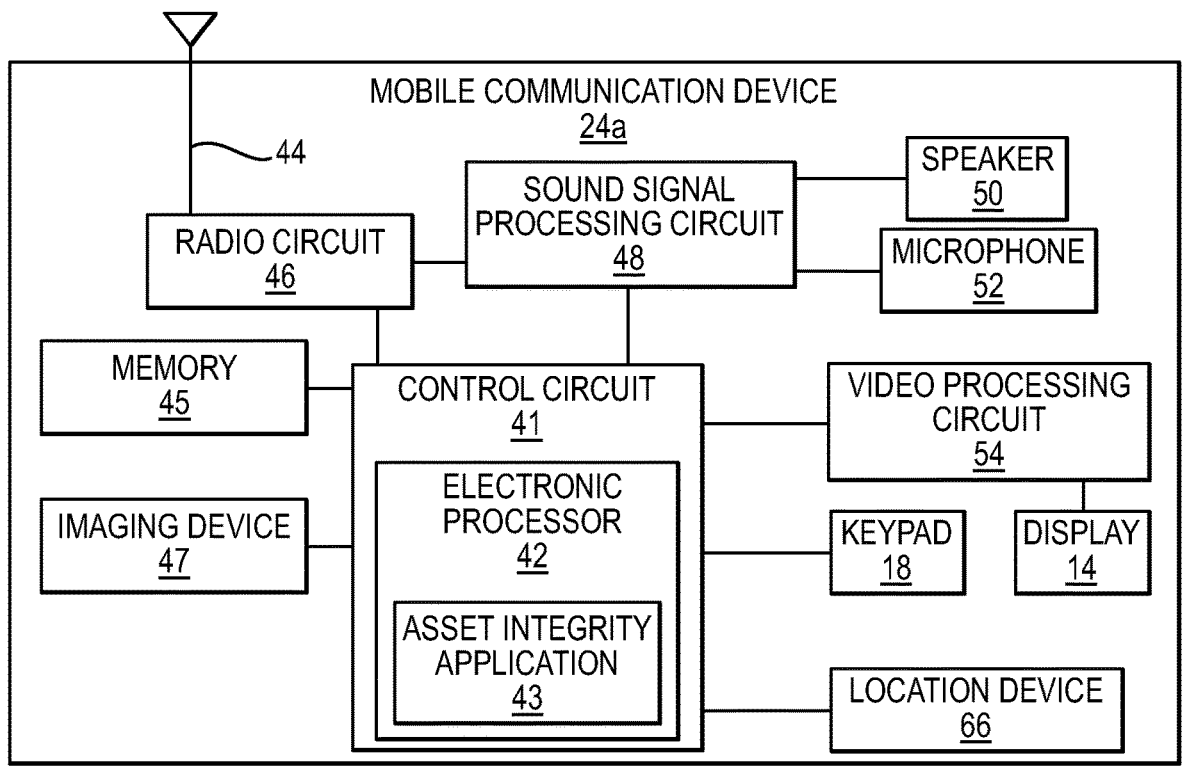
FIG. 2 is a schematic block diagram depicting operative portions of an exemplary mobile communication device in accordance with embodiments of the present invention.

FIG. 2 is a schematic block diagram depicting operative portions of a mobile communication device 24a in accordance with embodiments of the present invention. The device 24a may include a primary control circuit 41 that is configured to carry out overall control of the functions and operations of the device. The control circuit 41 may include an electronic processor 42, such as a CPU, microcontroller or microprocessor. Among their functions, to implement the features of the present invention, the control circuit 41 and/or electronic processor 42 may comprise a controller that may execute program code embodied as the asset integrity application 43. It will be apparent to a person having ordinary skill in the art of computer programming, and specifically in application programming for mobile electronic devices, how to program the device to operate and carry out logical functions associated with application 43. Accordingly, details as to specific programming code have been left out for the sake of brevity. Also, while the code may be executed by control circuit 41 in accordance with an exemplary embodiment, such controller functionality could also be carried out via dedicated hardware, firmware, software, or combinations thereof, without departing from the scope of the invention.

The mobile communication device has a display 14 that displays information to a user regarding the various features and operating state of device, and displays visual content received by the device and/or retrieved from a memory 45. Also, the display 14 may be used as an electronic viewfinder for a an imaging device 47, such as a camera assembly. Visual information is processed by a video processing circuit 54. The device further may have a keypad 18 that provides for a variety of user input operations. For example, keypad 18 typically includes alphanumeric keys for allowing entry of alphanumeric information. Keys or key-like functionality also may be embodied as a touch screen associated with the display 14. The device may include an antenna 44 coupled to a radio circuit 46. The radio circuit 46 includes a radio frequency transmitter and receiver for transmitting and receiving signals via the antenna 44 as is conventional in mobile communication devices. The device further includes a sound signal processing circuit 48 for processing audio signals transmitted by and received from the radio circuit 46. Coupled to the sound processing circuit 48 are a speaker 50 and microphone 52 as is conventional for many mobile communication devices.

Figure 3:
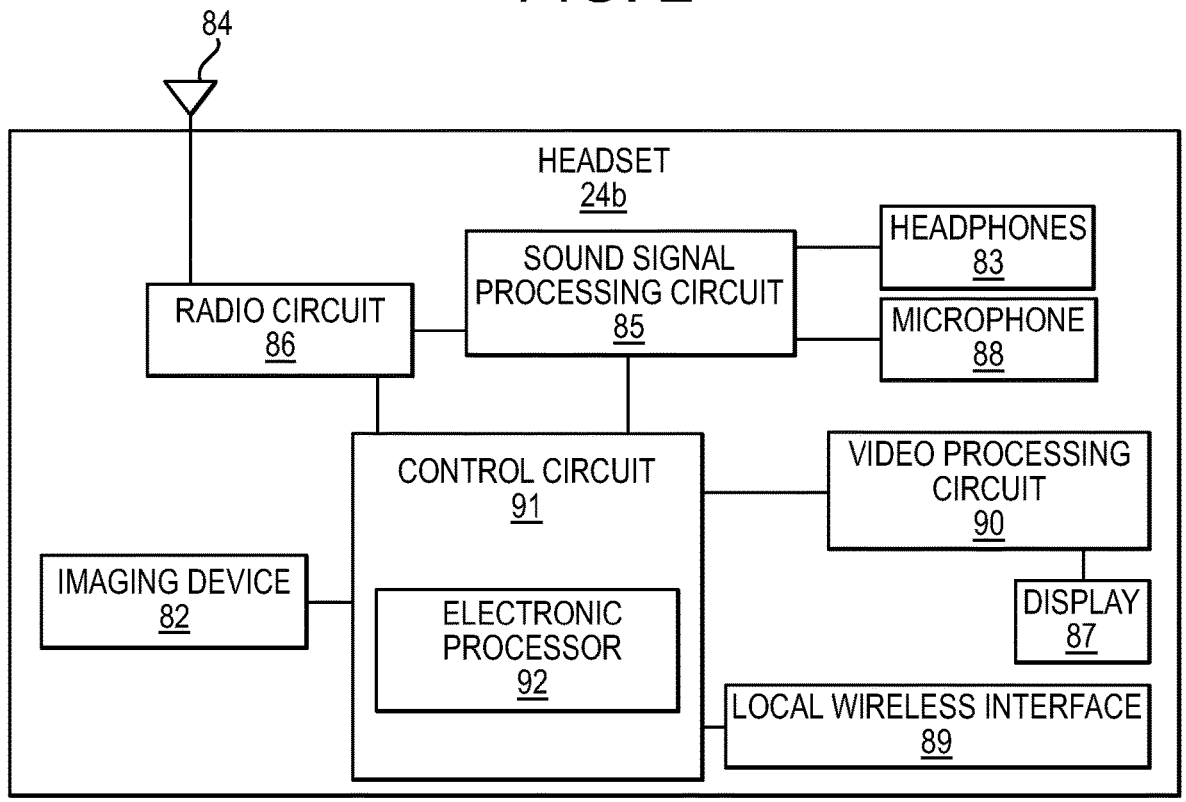
FIG. 3 is a schematic block diagram depicting operative portions of an exemplary headset in accordance with embodiments of the present invention.

FIG. 3 is a schematic block diagram depicting operative portions of an exemplary headset 24b in accordance with embodiments of the present invention. For a headset also having audio calling capabilities, a radio circuit 86 includes a radio frequency transmitter and receiver for transmitting and receiving signals via the antenna 84 as is conventional. The headset 24b further includes a sound signal processing circuit 85 for processing audio signals transmitted by and received from the radio circuit 86. Coupled to the sound processing circuit 85 are the earphones 83 and microphone 88. The headset may be configured as a head mounted display system that includes displays 87 in an eyeglass configuration for displaying information to a user. The displays 87 may be coupled to a video processing circuit 90 that converts video data to a video signal used to drive the various displays. An imaging device, such as a camera 82, may be used to capture images (still or video images) at a user's location. A local wireless interface 89, such as a Bluetooth, RF, infrared, or other short distance interface, may be used to transmit and receive data from other electronic devices, including the other mobile communication device 24a, as is conventional. The headset also may contain a control circuit 91, which may include an electronic processor 92, which controls overall operation of the headset.

Referring again to FIG. 1, the IAIMS 10 further may include one or more sensors 30 for sensing performance parameters related to the assets corresponding to the read asset information identifiers. The performance data accessed by the mobile communication device may include sensor data gathered by the at least one sensor. The sensors 30 may be employed to gather data based on local operating conditions, such as temperature, pressure, moisture levels or humidity, and the like.

As seen in FIG. 1, certain sensors such as sensor 30a may be location sensors that sense conditions for the broader location of the assets (e.g., a warehouse, ship hull or the like). Other sensors 30 may be equipment sensors that are provided directly on or within the assets 20. Equipment sensors 30 may sense directly one or more operating parameters at or of the asset. Such equipment sensors are particularly useful if the operating conditions of the equipment may vary substantially from the broader environmental conditions at the asset location (e.g., an asset may generate significant heat when operating). Another use of specific equipment sensors may be to track specific parameters of operation, such as cycle times or chronological time of an asset or asset component being "on" or in use. Specific equipment sensors further may be used to detect asset conditions that could be associated with integrity issues, such as wear, fatigue, displacement, reduced performance, and other suitable performance metrics of the assets that could be indicative of poor performance or potential failure. Sensors 30 may also have basic electronics capability, that would permit the sensors to store sensed data in a localized sensor memory, or to transmit sensed data to an external electronic device for further processing or storage.

The IAIMS 10 further may include a central communications controller 32 in wireless communication with the mobile communication device. The central communications controller may act as a communications hub for gathering combined information from the various sensors 30, which may be stored in a sensor database, and transmitting such combined information in a more centralized fashion to the mobile communication devices 24. The IAIMS 10 further may include a network server 34. The network server 34 may link wirelessly to the central communications controller 32, and to the mobile communication devices 24. The various wireless communications among the components of the IAIMS 10 are illustrated by the arrows in FIG. 1.

Figure 4:
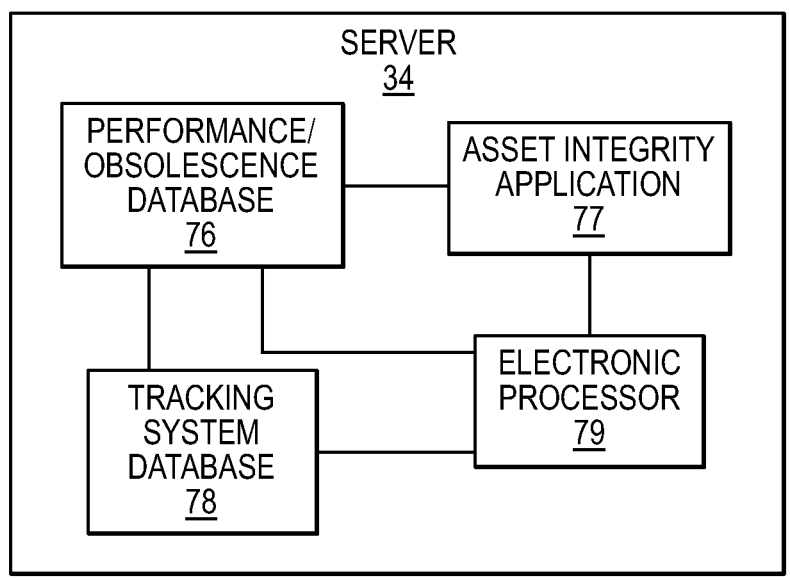
FIG. 4 is a schematic block diagram depicting operative portions of an exemplary server in accordance with embodiments of the present invention.

FIG. 4 is a schematic block diagram depicting operative portions of an exemplary network server 34 in accordance with embodiments of the present invention. The network server 34 may include database structures, and one or more electronic processor devices 79 that incorporate communications circuitry for communication with the communications controller and the mobile communication devices. The database structures may include a performance database 76 containing data received from the sensors and relating to real time conditions and actual performance, and a tracking system database 78 that includes tracking system data corresponding to the asset information identifiers, such as the tracking system tags affixed to the assets. The performance database 76 may include in part an obsolescence database. The obsolescence database may include information as to assets or asset components that may subjected to near-term or prior removal from the market. For example, as new products are developed, manufacture and related maintenance support of existing product lines may be phased out, which can be equated to an integrity issue with reference to an obsolescence database.

As further described below, in exemplary embodiments processing as to asset integrity management may be performed at the server level. Accordingly, the server 34 may also include an asset integrity management application 77 comparable to the asset integrity management application 43 located in the mobile communication device.

The IAIMS 10 improves over conventional tracking systems by integrating conventional tracking system data with real-time and actual performance information pertaining to the plurality of assets. With such integration, a technician can be alerted to maintenance and other integrity issues without having a specific trigger event, such as an actual failure or a specified inspection time. To accomplish such integration, the IAIMS is configured such that the following method steps of managing asset integrity issues are performed: (1) identify particular assets; (2) access the tracking system data for an identified asset; (3) receive performance data (which may include real time data, sensor data, and/or obsolescence data) for an identified asset; and (4) determine if any integrity issues are present based on the accessed and received data. Information about any integrity issues may then be outputted by the mobile communications device so such issues can be addressed by a technician. The system may include a non-transitory computer readable medium storing executable program code, such as the device asset integrity management application 43 or the server asset integrity management application 77, which when executed by an electronic processor or other computing device is configured to perform steps of the methods of managing asset integrity issues.

Various levels of integration may be achieved commensurate with a system user's needs. The level of desired integration may determine the nature of the system operation as being more passive or more active, which in turn dictates the precise components needed for the system.

At a first level of integration, the IAIMS 10 includes only the plurality of assets 20 with the asset information identifiers (e.g., tracking system tags 22), the one or more mobile communication devices 24, and the network sever 34. This first level of integration does not need to employ additional sensors. The mobile communication device is configured to transmit asset information read from asset information identifiers to the server. An electronic processor is configured to identify assets corresponding to the read asset information identifiers and to determine an asset integrity issue for any of the assets corresponding to the read asset information identifiers based on data stored in the server. An output device is configured to output an indicator associated with the determined integrity issue.

An advantage of the IAIMS 10 over conventional tracking systems is that assets may be identified without having to scan individual tags. This may be accomplished through a variety of mechanisms, which may be utilized either singularly or in combination. For example, visualization techniques may be employed to use object recognition to determine equipment type. The mobile communication devices may include an imaging device such as a camera for capturing images associated with the assets, and object recognition software to determine asset types. In exemplary embodiments, the mobile communication devices further may include a location device 66 (see FIG. 2) for generating location data as to the location of the mobile communication device, like GPS, which can be transmitted to the server to narrow the asset type to a particular asset. Such a system may operate as follows, using the air conditioning unit 20b as an example. Using object recognition, a processor device of the mobile communication device may determine the model of the unit. The location data can be used to determine exactly where the unit was installed. Combined, an electronic processor may use these pieces of information to identify the precise asset. In exemplary embodiments, spatial mapping techniques may be employed to map out a variety of objects and indicators for a desired area.

Another example of a visualization technique is to add a special visual recognition indicator to an asset as the asset information identifier. Such a recognition indicator may be particularly suitable for equipment assets that in turn include multiple component assets. An imaging device on the mobile communication device (e.g., a camera) can capture an image of the recognition indicator. Using recognition technology, a mobile communication device can recognize the recognition indicator and thereby identify all component assets associated with a more generalized equipment asset. For example, the air conditioning unit 20b includes a variety of hoses, fittings, gauges, and other components. A visual recognition indicator 22 may be provided on an outer face of the air conditioning unit, which can be recognized by the mobile communications device. Upon such recognition, the generalized asset (e.g., air conditioning unit) can be identified, with additional identification of all component assets in such unit (e.g., hoses, gauges, fittings) being linked by the asset recognition indicator.

Visualization techniques may be implemented using known imaging and camera technologies. Cameras, and digital still/video cameras in particular, are now common in mobile communication devices, such as smartphones and tablet computers. Another configuration is to mount a camera device on a headset as shown as to the headset 24b in FIGS. 1 and 3. With such camera usage, a technician can simply walk through a location or facility and scan the area capturing asset images to perform the visualization technique. In the configuration of a headset camera, line-of-sight provides an efficient mechanism for performing the visual techniques. In simple terms, a technician may identify assets simply by looking around a location.

Visualization techniques may be combined with other electronic identification techniques. RFID technology and similar near-field-communication (NFC) techniques may provide a suitable mechanism to supplement visualization techniques. In RFID and comparable NFC technologies, a reading device such as a scanner, through electromagnetic emission, constitutes a power source for a transmitting antenna incorporated into a tag. NFC technologies, however, typically require a user to be relatively close (within perhaps a few feet) of the device being read. In exemplary embodiments, therefore, NFC techniques may be combined with visualization techniques. For example, visualization techniques may be employed to provide generalized indications of areas that may warrant further investigation, with the NFC techniques then being used for more specific identification of particular assets.

Again, an advantage of the identification techniques of the present invention over conventional tracking systems is the ability to identify assets without having to find and scan numerous individual tags. As referenced above, once the various assets are identified, the second operation performed by the IAIMS 10 may be to access the tracking system data for the identified assets. Specifically, the tracking system data may be accessed from the tracking system database 78 stored on the network server 34.

The mobile communication devices 24 preferably are in wireless communication with the network server 34. In exemplary embodiments, the network server may be accessible over an external network, such as via the Internet or a cellular network. In some circumstances, however, access to external networks may be limited. For example, the assets may be in a location that is remote, or which is not suitable for transmission of an external signal (e.g., inside a ship hull, underground or basement facility). In such circumstances, the mobile communication devices may be able to communicate with a network server over a more localized wireless network.

As described in the background section above, the tracking system data may include basic asset identifying information corresponding to information contained on the tracking system tag. The tracking system database may include additional information about the component part or asset, such as, for example, more detailed customer information, bills of material, application data, maintenance history if updates are made to the database, maintenance cycles, certification information, components drawings, and the like.

As referenced above, once the tracking system data has been accessed, the third operation performed by the IAIMS 10 may be to receive real time and/or performance data for an identified asset. From the real-time and performance data, an electronic processor in either the mobile communication device or the server may perform the fourth operation of determining if any integrity issues are present based on the accessed tracking system data and the received real-time and performance data.

For this first level of integration, actual performance data largely is derived based on the tracking system data. For example, actual performance data may include whether an assert is approaching limits of its useful life based on the date of manufacture and/or installation. Location information in the tracking system data also may be employed in a useful life determination, e.g., an asset employed in a location with on-average mild environmental conditions may have a useful life that is longer than an asset employed in a location with on-average harsh environmental conditions. In embodiments in which an obsolescence database further is accessible from the network server 34, actual performance data may include whether an assert is being subject to withdrawal from the market in favor of a newer product.

Actual performance data further may include related products data. For example, for stock or commodity-like assets for which there may be many in a given location or equipment (e.g., hoses, fittings), it sometimes may be less costly to replace all such items at once despite only an individual component integrity issue. In other words, replacement of multiple related products in the event of an integrity issue as to only one of them may be more cost effective than performing serial maintenance operations as each specific product develops an integrity issue. Accordingly, the performance data may include related products data that has cross-references to other assets that may be replaced all together in the event of an integrity issue as to one.

As referenced above, an electronic processor may be employed to receive the tracking system data and the real time/actual performance data for an identified asset. From the tracking system data and performance data, the electronic processor may render a determination of asset integrity. The electronic processor may be implemented in a hardware circuit(s), a central process or processing unit (CPU) executing software code or instructions that are encoded within non-transitory computer readable media accessible to the processor (e.g., asset integrity management applications 43 and 77), or a combination of a hardware circuit(s) and a processor or control block of an integrated circuit executing machine readable code encoded within a non-transitory computer readable medium. Such terms may be used interchangeably for any electronic processor constituting a processor or control block executing code encoded in a non-transitory computer readable medium, or a combination of a hardware circuit(s) and a processor and/or control block executing such code.

In exemplary embodiments, the electronic processor is a local electronic processor that is incorporated into at least one of the mobile communication devices 24, as depicted in FIG. 2. In such embodiment, the network server transmits tracking system data and the performance data to the mobile communication device over the wireless network. The electronic processor then analyzes the received data and determines whether an integrity issue is present as to any of the assets. In another exemplary embodiment, the electronic processor is a network electronic processor that is incorporated into the network server 34, as depicted in FIG. 4. In such embodiment, the network server analyzes the tracking system data and the performance data, and determines whether an integrity issue is present with any of the assets. The network server then transmits the results and information about any determined integrity issues to the mobile communication device over the wireless network.

The mobile communication device further includes an output device that is configured to output a result of the integrity determination performed by the electronic processor. The output device may be a display on the mobile communication device. In exemplary embodiments, the output may be in the form of a visual indicator that is outputted on the display, and that is indicative of the presence or absence of an integrity issue for each of the identified assets. The visual indicator may encompass multiple indicators that are indicative of gradations of integrity issues.

For example, multiple visual indicators may constitute a color based system that can inform a technician of the relative imminence or importance of an integrity issue. In this example, a green indicator associated with an asset may indicate no integrity issue. A yellow indicator may indicate an integrity issue that poses no imminent need of action, but may need to be tracked or monitored for further issue. A red indicator may indicate an imminent need of action, such as a repair, replacement or other maintenance action.

The visual indicators may be displayed on the mobile communication device 24 in combination with asset identification information. For numerous assets being investigated by a technician, scrollable tables may be displayed of corresponding integrity indicators and asset identification information. Smartphones, tablet computers, and like devices conventionally have suitable display systems. In addition, display technology now permits displays to be incorporated into a headset as a head mounted display, such as in an eyeglass configuration for example as shown in the headset 24b of FIGS. 1 and 3.

In exemplary embodiments, additional alerts may be outputted by the mobile communication device, particularly as related to the level of the integrity issue. The output device of the mobile communication device further may include the speaker 50 (see FIG. 2) so as to enhance the indication of an integrity issue. For example, a red visual indicator may be accompanied by an audio alert outputted by the speaker to emphasize the imminence of the integrity issue. The output device further may include a haptic indicator, and the output may include haptic feedback outputted by the haptic indicator as part of the alert system. An exemplary haptic indicator may be a vibration generator as now are common in smartphones and like communication devices.

In exemplary embodiments, the electronic processor further may be configured to generate recommendations for the technician to address any determined asset integrity issues. Any such recommendations may be outputted to the display in conjunction with the integrity indicators. Relatedly, the electronic processor automatically may order replacement assets or generate other appropriate maintenance orders. Furthermore, using a conventional input mechanism on the mobile communication device (e.g., touch screen, keyboard, cursor), the technician may update information pertaining to the asset, which may be stored on the network server in the tracking system database or the performance database. The electronic processor further may be configured to recommend countermeasures to prevent asset failure, for example by employing programmed logic scenarios that permit countermeasure decision making. The logic scenarios may be stored on the server in connection with the server databases.

As is evident from the above description, in the first level of integration, the system is sensor free, and the actual performance data is largely derived from the stored tracking system data. At a second level of integration, the system may be augmented by the presence of sensors 30 and sensor data generated by the sensors 30.

As referenced above, FIG. 1 depict sensors 30 that may be employed as part of the IAIMS 10. Certain sensors such as sensor 30a may be location sensors that sense conditions for the broader location of the assets (e.g., a warehouse, ship hull or the like). Alternatively, other sensors 30 may be equipment sensors that are provided directly on or within the assets 20, which may sense the direct operating conditions and status of the asset. The sensors may sense such parameters as pressure, temperature, moisture level, cycle time, on-off time, physical wear, asset performance metrics, and like conditions as they change over time. Sensors 30 may also have basic electronics capability, that would permit the sensors to store sensed data in a memory, or to transmit sensed data to an external electronic device, such as the network server, for further processing or storage.

If transmission capabilities are incorporated into sensors, an additional capability may be to provide an "active tag" with associated transmission capabilities. In contrast to a conventional tag that must be read at close range by a scanner, an active tag may transmit asset identification information that can be picked up by the mobile communication device. Active tags, therefore, may provide enhanced efficiency to asset identification.

In exemplary embodiments, sensor data may be transmitted from the sensors over the wireless network to the network server 34. The network server 34 may store the sensor data as part of the performance database that contains the real time and actual performance data. The sensor data may augment the first level performance data, so as to permit the electronic processor to provide an enhanced integrity issue determination for each asset.

In a third level of integration, the IAIMS 10 further may employ use of the central communications controller 32. The central communications controller may act as a communications hub for gathering combined information from the various sensors 30, and transmitting such combined information in a more centralized fashion to the mobile communication devices 24. The central communications controller 32 likewise may have a computer based architecture similar to the network server, and may include database structures, communications circuitry for communication with the server and mobile communication devices, and one or more processor devices.

The database structures of the central communications controller 32 may provide a centralized storage component for tracking system and sensor data. In this manner, all necessary information about the assets 20 may be provided to the mobile communication devices 24 via the central communications controller 32 over a wireless interface, without the need for the user to have to engage directly with individual pieces of equipment at all.

The IAIMS 10 may operate in accordance with a "framing" algorithm to identify integrity issues for multiple assets. Generally, a framing algorithm presents the user initially with a broad, long view of integrity issues, and then by a drill down technique provides ever more precise views. A framing technique may include the steps of identifying a plurality of assets in a first frame; determining if any integrity issues are present for the identified plurality of assets in the first frame; outputting on the mobile communication device a first indicator about determined integrity issues for the plurality of assets in the first frame, wherein the first indicator is a generalized indicator about integrity issues of assets in the first frame; identifying at least one asset in a second frame, the second frame being a narrower frame that is a subset of the first frame; determining if any integrity issues are present for the at least one identified asset in the second frame; and outputting on the mobile communication device a second indicator about determined integrity issues for the least one asset in the second frame. The framing algorithm may employ a drill down technique by which the above steps are repeated as to successively narrowing frames until an integrity issue is identified for a particular asset or assets.

For example, a user may enter a location with multiple assets (e.g., ship hull, warehouse). Initially, indicators may indicate a generalized condition as to whether integrity issues are present within the location. In the exemplary green-yellow-red indicator system above, different shades of color for the location may be presented on the mobile communication device, with the more green shades indicating fewer or less imminent integrity issues, through the shades of yellow to red indicating a greater number and/or more imminent integrity issues. In the drill down technique, as a user walks or otherwise moves through the location, narrower and narrower frames are presented that are subsets of the broader preceding frames. For example, a user may be presented with indicators related to a region of the location, then a group of assets within the region, than a multi-component asset from the group, and so on, so as to identify specific integrity issues as may be appropriate for a given frame.

As the user hones in on narrower and narrower frames related to the broader location, more precise visual indicators may be presented on the mobile communication device. For example, should the drill down technique result in the visual indicator shading more toward the green spectrum for a given narrower frame, such indicator informs the user that assets in such frame have few and/or non-imminent integrity issues. Conversely, should the drill down technique result in the visual indicator shading more toward the yellow or red spectrum for the given narrower frame, such indicator informs the user that assets in such frame have a greater number and/or more imminent integrity issues. In this manner, the IAIMS 10 leads the user to more precise identification of asset integrity issues.

Although such a framing algorithm may be used at any integration level, the framing algorithm is particularly suitable for use in conjunction with use of the central communications controller 32. With a more centralized storage of local asset information in the central communications controller 32, the presentation of frame information is more readily presentable to the user, insofar as the central communications controller obviates the need for the user to interact with specific assets. As the user moves through the location, therefore, the central communications controller transmits asset information to the mobile communication devices as to the narrower and narrower frames for precise identification of asset integrity issues.

The described integrated asset integrity management system, therefore, has significant advantages over conventional asset tracking and systems. The described system permits a technician to identify with precision asset integrity issues without a trigger event, such as an actual failure or a scheduled general inspection for a particular asset. By identifying asset integrity issues without a trigger event, downtime is minimized and maintenance otherwise is rendered more efficient as compared to conventional asset management systems.

Further features of the IAIMS may include the following. In exemplary embodiments, the IAIMS has a user experience or role awareness that adapts to user experience levels or roles, thereby managing the relationship between information delivered and the situation of a specific user. For example, a plant maintenance technician may have a different user experience level or scope as compared to a service technician for a given component. Information would therefore be tailored to the nature or level of experience of a particular user. In this example, the IAIMS could provide a maintenance technician information pertaining to diagnosing an asset integrity issue, whereas the IAIMS could provide a service information pertaining remedying an integrity issue.

Another feature of the IAIMS may be a situational awareness that manages a relationship between the user activity and asset or component use. For example, the IAIMS may notify end users when assets or components become available or unavailable due to situational circumstances, such as for example lockouts, tagouts, shift changes, and other operational circumstances.

Relatedly, the IAIMS may have additional operational awareness that manages the relationships driving access to other systems. For example, the IAIMS may account for the escalation of issues to different tiers of support or need. Accountability factors also may be considered by the IAIMS in driving decisions. The IAIMS further may have a collision awareness that manages any overlap or compatibility that could be associated with user action. For example, the IAIMS may ensure that two users are not designated to address a comment asset at the same time, or the system may ensure that conflicting actions are not being taken by different users. The IAIMS further may include management tools associated with these various awareness aspects, that may provide for queries to the IAIMS to monitor the system performance.

An aspect of the invention, therefore, is an integrated asset integrity management system (IAIMS). In exemplary embodiments, the IAIMS includes a plurality of asset information identifiers associated with a corresponding plurality of assets, a mobile communication device comprising a reading device for reading the plurality of asset information identifiers, and a server in electronic communication with the mobile communication device. The server includes a database structure having a tracking system database that includes tracking system data corresponding to the asset information identifiers, and a performance database that includes data relating to performance of the assets. The mobile communication device is configured to transmit asset information read from asset information identifiers to the server. An electronic processor is configured to identify assets corresponding to the read asset information identifiers and to determine an asset integrity issue for any of the assets corresponding to the read asset information identifiers based on data in the database structure. An output device is configured to output an indicator associated with the determined integrity issue.

In an exemplary embodiment of the IAIMS, the asset information identifiers each comprises a coded tag that may be affixed to an asset, and the reading device comprises a scanner configured to read the coded tag.

In an exemplary embodiment of the IAIMS, the reading device reads the coded tag using near field communication.

In an exemplary embodiment of the IAIMS, the asset information identifiers each comprises a recognition indicator that may be affixed to an asset, and the reading device comprises an imaging device configured to capture an image of the recognition indicator to identify assets associated with the recognition indicator.

In an exemplary embodiment of the IAIMS, the reading device comprises an imaging device configured to capture an image of an asset, and the electronic processor is configured to perform object recognition to identify the asset associated with the captured image.

In an exemplary embodiment of the IAIMS, the mobile communication device further comprises a location device for generating location data as to the location of the mobile communication device; the mobile communication device is configured to transmit the location data to the server; and the electronic processor is configured to identify assets corresponding to the read asset information identifiers at least in part based on the location data.

In an exemplary embodiment of the IAIMS, the electronic processor is located in the mobile communication device, and the server is configured to transmit data from the database structure about assets corresponding to the read asset information identifiers to the mobile communication device.

In an exemplary embodiment of the IAIMS, the electronic processor is located in the server, and the server is configured to transmit information about the determined integrity issue to the mobile communication device.

In an exemplary embodiment of the IAIMS, the output device comprises a display on the mobile communication device, and the indicator comprises a visual indicator displayed on the display.

In an exemplary embodiment of the IAIMS, the output device further comprises a speaker on the mobile communication device, and the indicator further comprises an audio indicator outputted by the speaker.

In an exemplary embodiment of the IAIMS, the output device further comprises a haptic indicator on the mobile communication device, and the indicator further comprises haptic feedback outputted by the haptic indicator.

In an exemplary embodiment of the IAIMS, the IAIMS further includes at least one sensor for sensing performance parameters related to the assets corresponding to the read asset information identifiers, wherein the performance data includes sensor data gathered by the at least one sensor.

In an exemplary embodiment of the IAIMS, the at least one sensor includes an equipment sensor that senses one or more operating parameters of a corresponding asset.

In an exemplary embodiment of the IAIMS, the one or more operating parameters comprises at least one of pressure, temperature, moisture level, cycle time, on-off time, physical wear, fluid contamination or deterioration, and performance metrics.

In an exemplary embodiment of the IAIMS, the at least one sensor includes a location sensor that senses environmental conditions at the location of the assets corresponding to the read asset information identifiers.

In an exemplary embodiment of the IAIMS, the sensor data is transmitted to the server and stored in the performance database.

In an exemplary embodiment of the IAIMS, the IAIMS further includes a central communications controller in wireless communication with the mobile communication device, wherein the sensor data is transmitted to the central communications controller and stored in a sensor database.

In an exemplary embodiment of the IAIMS, the performance database includes an obsolescence database.

In an exemplary embodiment of the IAIMS, the electronic processor further is configured to generate a recommendation for addressing the determined asset integrity issue, and the output device further is configured to output the recommendation.

In an exemplary embodiment of the IAIMS, the electronic processor is located at least in part in the central communications controller, and the electronic processor further is configured to generate a recommendation for addressing the determined asset integrity issue, and the output device further is configured to output the recommendation.

Another aspect if the invention is a method of managing asset integrity issues. In exemplary embodiments, the managing method includes steps of: identifying at least one asset; accessing tracking system data for the at least one identified asset; receiving performance data for the at least one identified asset; determining if any integrity issues are present for the at least one identified asset based on the accessed and received data; and outputting on a mobile communication device information about a determined integrity issue.

In an exemplary embodiment of the managing method, the method further includes generating a recommendation for addressing the determined asset integrity issue, and outputting the recommendation on the mobile communication device.

In an exemplary embodiment of the managing method, the method further includes taking a countermeasure to prevent an asset failure.

In an exemplary embodiment of the managing method, the method further includes identifying a plurality of assets in a first frame; determining if any integrity issues are present for the identified plurality of assets in the first frame; outputting on the mobile communication device a first indicator about determined integrity issues for the plurality of assets in the first frame, wherein the first indicator is a generalized indicator about integrity issues of assets in the first frame; identifying at least one asset in a second frame, the second frame being a narrower frame that is a subset of the first frame; determining if any integrity issues are present for the at least one identified asset in the second frame; and outputting on the mobile communication device a second indicator about determined integrity issues for the least one asset in the second frame.

In an exemplary embodiment of the managing method, the method further includes performing a drill down technique by which the steps of claim 24 are repeated as to successively narrowing frames until an integrity issue is identified for a particular asset.

In an exemplary embodiment of the managing method, the identifying step includes fixing a coded tag to an asset, and scanning the coded tag with a scanner on the mobile communication device.

In an exemplary embodiment of the managing method, the identifying step includes fixing a recognition indicator to an asset, and capturing an image of the recognition indicator with an imaging device on the mobile communication device to identify assets associated with the recognition indicator.

In an exemplary embodiment of the managing method, the identifying step includes capturing an image of an asset with an imaging device on the mobile communication device, and performing object recognition to identify the asset associated with the captured image.

In an exemplary embodiment of the managing method, the performance data includes sensor data gathered by least one sensor for sensing performance parameters related to the indentified plurality of assets.

In an exemplary embodiment of the managing method, the at least one sensor includes an equipment sensor that senses one or more operating parameters of a corresponding asset.

In an exemplary embodiment of the managing method, the one or more operating parameters comprises at least one of pressure, temperature, moisture level, cycle time, on-off time, physical wear, fluid contamination or deterioration, and performance metrics.

In an exemplary embodiment of the managing method, the at least one sensor includes a location sensor that senses environmental conditions at the location of the assets.

In an exemplary embodiment of the managing method, the performance data includes obsolescence data.

Another aspect of the invention is a non-transitory computer readable medium storing executable program code, which when executed by an electronic device is configured to perform the steps of: identifying at least one asset; accessing tracking system data for the at least one identified asset; receiving performance data for the at least one identified asset; determining if any integrity issues are present for the at least one identified asset based on the accessed and received data; and outputting on a mobile communication device information about a determined integrity issue.

In an exemplary embodiment of the non-transitory computer readable medium, the code is executed to perform the further steps of: generating a recommendation for addressing the determined asset integrity issue; and outputting the recommendation on the mobile communication device.

In an exemplary embodiment of the non-transitory computer readable medium, the code is executed to perform the further steps of: identifying a plurality of assets in a first frame; determining if any integrity issues are present for the identified plurality of assets in the first frame; outputting on the mobile communication device a first indicator about determined integrity issues for the plurality of assets in the first frame, wherein the first indicator is a generalized indicator about integrity issues of assets in the first frame; identifying at least one asset in a second frame, the second frame being a narrower frame that is a subset of the first frame; determining if any integrity issues are present for the at least one identified asset in the second frame; outputting on the mobile communication device a second indicator about determined integrity issues for the least one asset in the second frame.

In an exemplary embodiment of the non-transitory computer readable medium, the code is executed to perform the further steps of: performing a drill down technique by which the previous steps are repeated as to successively narrowing frames until an integrity issue is identified for a particular asset.

Another aspect of the invention is a mobile communication device. In exemplary embodiments, the mobile communication device includes an electronic processor configured to perform the steps of: identifying at least one asset; accessing tracking system data for the at least one identified asset over a wireless interface; receiving performance data for the at least one identified asset over the wireless interface; and determining if any integrity issues are present for the at least one identified asset based on the accessed and received data. The mobile communication device further includes an output device for outputting information about the determined integrity issue.

In an exemplary embodiment of the mobile communication device, the electronic processor further is configured to generate a recommendation for addressing the determined asset integrity issue, and the output device outputs the recommendation.

In an exemplary embodiment of the mobile communication device, the device further includes an imaging device that captures an image associated with an asset, and the electronic processor is configured to identify the at least one asset based on the captured image.

In an exemplary embodiment of the mobile communication device, the output device includes a display, and the information about the determined integrity issue is displayed on the display.

In an exemplary embodiment of the mobile communication device, the output device further comprises a speaker that outputs an audio indicator of the determined integrity issue.

In an exemplary embodiment of the mobile communication device, the output device further comprises a haptic indicator, and the indicator further comprises haptic feedback outputted by the haptic indicator.

In an exemplary embodiment of the mobile communication device, the electronic processor further is configured to transmit data pertaining to the asset to another electronic device.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An integrated asset integrity management system (IAIMS) comprising:
    a plurality of asset information identifiers associated with a corresponding plurality of assets;
    a mobile communication device comprising a reading device for reading the plurality of asset information identifiers;
    a server in electronic communication with the mobile communication device, the server including a database structure having a tracking system database that includes tracking system data corresponding to the asset information identifiers, and a performance database that includes data relating to performance of the assets;
    wherein the mobile communication device is configured to transmit asset information read from asset information identifiers to the server;
    an electronic processor configured to identify a plurality of assets corresponding to the read asset information identifiers and to determine an asset integrity issue for any of the assets corresponding to the read asset information identifiers based on data in the database structure, wherein the electronic processor is configured to identify the plurality of assets in a first frame and determine if any integrity issues are present for the identified plurality of assets in the first frame, and wherein the electronic processor is configured to identify at least one asset of the plurality of assets in a second frame, the second frame being a narrower frame that is a subset of the first frame, and determine if any integrity issues are present for the at least one identified asset in the second frame;
    wherein the tracking system data of the tracking system database comprises a pertinent date in the asset tracking and history information relating to the asset, and the electronic processor integrates the tracking system data with the performance data received in real time to determine the integrity issue; and
    an output device configured to output an indicator associated with the determined integrity issue, wherein the output device is configured to output on the mobile communication device a first indicator about determined integrity issues for the plurality of assets in the first frame, wherein the first indicator is a generalized indicator about integrity issues of assets in the first frame, and wherein the output device is configured to output on the mobile communication device a second indicator about determined integrity issues for the at least one asset in the second frame.

2. The IAIMS of claim 1, wherein the asset information identifiers each comprises a coded tag that may be affixed to an asset, and the reading device comprises a scanner configured to read the coded tag.

3. The IAIMS of claim 1, wherein the asset information identifiers each comprises a recognition indicator that may be affixed to an asset, and the reading device comprises an imaging device configured to capture an image of the recognition indicator to identify assets associated with the recognition indicator.

4. The IAIMS of claim 1, wherein the reading device comprises an imaging device configured to capture an image of an asset, and the electronic processor is configured to perform object recognition to identify the asset associated with the captured image.

5. The IAIMS of claim 1, wherein:
    the mobile communication device further comprises a location device for generating location data as to the location of the mobile communication device;
    the mobile communication device is configured to transmit the location data to the server; and
    the electronic processor is configured to identify assets corresponding to the read asset information identifiers at least in part based on the location data.

6. The IAIMS of any of claim 1, further comprising at least one sensor for sensing performance parameters related to the assets corresponding to the read asset information identifiers, wherein the performance data includes sensor data gathered by the at least one sensor.

7. The IAIMS of claim 6, wherein the sensor data is transmitted to the server and stored in the performance database.

8. The IAIMS of claim 6, further comprising a central communications controller in wireless communication with the mobile communication device, wherein the sensor data is transmitted to the central communications controller and stored in a sensor database.

9. The IAIMS of claim 1, wherein the performance database includes an obsolescence database.

10. The IAIMS of claim 1, wherein the electronic processor further is configured to generate a recommendation for addressing the determined asset integrity issue, and the output device further is configured to output the recommendation.

11. A method of managing asset integrity issues comprising the steps of:
    identifying at least one asset;
    accessing tracking system data for the at least one identified asset, wherein the tracking system data comprises a pertinent date in the asset tracking and history information relating to the asset;
    receiving performance data for the at least one identified asset;
    determining if any integrity issues are present for the at least one identified asset based on the accessed and received data, by integrating the tracking system data with the performance data received in real time to determine the integrity issue; and
    outputting on a mobile communication device information about a determined integrity issue,
    wherein the method further comprises:
        identifying a plurality of assets in a first frame;
        determining if any integrity issues are present for the identified plurality of assets in the first frame;
        outputting on the mobile communication device a first indicator about determined integrity issues for the plurality of assets in the first frame, wherein the first indicator is a generalized indicator about integrity issues of assets in the first frame;
        identifying at least one asset in a second frame, the second frame being a narrower frame that is a subset of the first frame;
        determining if any integrity issues are present for the at least one identified asset in the second frame; and outputting on the mobile communication device a second indicator about determined integrity issues for the least one asset in the second frame.

12. The method of claim 11, further comprising:
generating a recommendation for addressing the determined asset integrity issue; and
outputting the recommendation on the mobile communication device.

13. The method of claim 11, further comprising performing a drill down technique by which the steps of claim 11 are repeated as to successively narrowing frames until an integrity issue is identified for a particular asset.

14. The method of claim 11, wherein the identifying step includes fixing a coded tag to an asset, and scanning the coded tag with a scanner on the mobile communication device.

15. The method of claim 11, wherein the identifying step includes fixing a recognition indicator to an asset, and capturing an image of the recognition indicator with an imaging device on the mobile communication device to identify assets associated with the recognition indicator.

16. The method of claim 11, wherein the identifying step includes capturing an image of an asset with an imaging device on the mobile communication device, and performing object recognition to identify the asset associated with the captured image.

17. The method of claim 11, wherein the performance data includes sensor data gathered by least one sensor for sensing performance parameters related to the identified plurality of assets.

18. The method of claim 11, wherein the performance data includes obsolescence data.

19. A non-transitory computer readable medium storing executable program code, which when executed by an electronic device is configured to perform the steps of:
identifying at least one asset;
accessing tracking system data for the at least one identified asset, wherein the tracking system data comprises a pertinent date in the asset tracking and history information relating to the asset;
receiving performance data for the at least one identified asset;
determining if any integrity issues are present for the at least one identified asset based on the accessed and received data, by integrating the tracking system data with the performance data received in real time to determine the integrity issue; and
outputting on a mobile communication device information about a determined integrity issue,
wherein the non-transitory computer readable medium storing executable program code, which when executed by the electronic device is further configured to perform the steps of:
identifying a plurality of assets in a first frame;
determining if any integrity issues are present for the identified plurality of assets in the first frame;
outputting on the mobile communication device a first indicator about determined integrity issues for the plurality of assets in the first frame, wherein the first indicator is a generalized indicator about integrity issues of assets in the first frame;
identifying at least one asset in a second frame, the second frame being a narrower frame that is a subset of the first frame;
determining if any integrity issues are present for the at least one identified asset in the second frame; and
outputting on the mobile communication device a second indicator about determined integrity issues for the least one asset in the second frame.

* * * * *